(12) United States Patent
Shimizu et al.

(10) Patent No.: US 11,659,116 B2
(45) Date of Patent: May 23, 2023

(54) DETERMINATION DEVICE AND DETERMINATION PROGRAM

(71) Applicant: Horizon International Inc., Takashima (JP)

(72) Inventors: Taishi Shimizu, Takashima (JP); Takanori Kitani, Takashima (JP)

(73) Assignee: Horizon International, Inc., Takashima (JP)

( * ) Notice: Subject to any disclaimer, the term of this patent is extended or adjusted under 35 U.S.C. 154(b) by 0 days.

(21) Appl. No.: 17/082,905

(22) Filed: Oct. 28, 2020

(65) Prior Publication Data

US 2021/0136244 A1 May 6, 2021

(30) Foreign Application Priority Data

Oct. 31, 2019 (JP) .............................. JP2019-198586

(51) Int. Cl.
*H04N 1/00* (2006.01)
*H04N 1/32* (2006.01)

(52) U.S. Cl.
CPC ..... *H04N 1/00639* (2013.01); *H04N 1/32529* (2013.01)

(58) Field of Classification Search
CPC ................................................ H04N 1/00639
USPC ....................................................... 358/1.15
See application file for complete search history.

(56) References Cited

U.S. PATENT DOCUMENTS

| 2006/0238793 | A1* | 10/2006 | Akashi ................. G06F 3/1204 358/1.13 |
| 2014/0064882 | A1 | 3/2014 | Sato |
| 2014/0268206 | A1* | 9/2014 | Tokuoka ............... G06F 3/1219 358/1.14 |
| 2017/0060489 | A1* | 3/2017 | Sato ....................... G06F 3/126 |
| 2019/0146393 | A1* | 5/2019 | Matsumoto ........ G03G 15/6541 399/410 |

FOREIGN PATENT DOCUMENTS

| EP | 1 717 690 A2 | 11/2006 |
| EP | 1 840 758 A2 | 10/2007 |
| JP | 2010-079673 A | 4/2010 |

OTHER PUBLICATIONS

Extended Euroean Search Report for European Application No. 202024275.0 dated Mar. 29, 2021.

* cited by examiner

*Primary Examiner* — Jacky X Zheng
(74) *Attorney, Agent, or Firm* — Muncy, Geissler, Olds & Lowe, P.C.

(57) ABSTRACT

A determination device (1) includes a first storage unit (10), a determination unit (12), an input unit (13), and an update unit (14). The first storage unit (10) stores one or more processing rules of a post-printing processor (4) predetermined based on processing know-how for a post-printing process. The input unit (13) receives input of information about an update of the processing rules. The update unit (14) updates the processing rules stored in the first storage unit based on the input of information about the update of the processing rules. The determination unit (12) determines whether a post-printing processing instruction information generated by a pre-printing processor (2) satisfies the one or more processing rules.

10 Claims, 5 Drawing Sheets

FIG. 4

| Serial No. | Rule ID | Processing Unit Name | Rule |
|---|---|---|---|
| 00001 | 001 | Folding Unit | (Body Width + 1mm) < Cover Width < (Body Width + 3mm) |
| | 002 | Trimming Unit | (Cover Width After Trimming + 1mm) < Cover Width Before Trimming (Cover Width After Trimming + 5mm) > Cover Width Before Trimming |
| | 003 | Milling Unit | (Milling Width + 1mm) < Spine Width < (Milling Width + 3mm) |
| | 004 | Wrapping Unit | |
| | 005 | Binding Unit | |

DETERMINATION DEVICE AND DETERMINATION PROGRAM

CROSS-REFERENCE TO RELATED APPLICATION

This application is based upon and claims the benefit of priority of the prior Japanese Patent Application No. 2019-198586, filed on Oct. 31, 2019, the entire contents of which are incorporated herein by reference.

TECHNICAL FIELD

The embodiments discussed herein are related to a determination device and a determination program for determining whether post-printing processing instruction information for a post-printing processor generated by a pre-printing processor is appropriate.

BACKGROUND

Post-printing processing related to bookbinding includes various types of processing. For example, in the bookbinding of paperbound books, the types of post-printing processing include cutting, folding, collating, milling, binding, wrapping, and trimming. There is a post-printing processing unit (referred to below as "post-printing processing unit" or "post-printing processor") corresponding to each post-printing processing. In recent years, there has been a need for many kinds in small lots, however, setting each post-printing processing unit manually each time a job is changed has been time-consuming. Thus, in order to shorten such setting time in these post-printing processing units, automatic setting by a computer has been in progress.

Specifically, (1) a pre-printing processor performs an imposition corresponding to the specification of each post-printing processing unit. (2) The pre-printing processor generates post-printing processing instruction information corresponding to the imposition, and converts the generated post-printing processing instruction information into a common format readable on each post-printing processing unit. (3) Each post-printing processing unit performs post-printing processing according to the converted post-printing processing instruction information. As a result, it is possible to achieve significant labor saving in these post-printing processing units. As such format, for example, Job Definition Format (JDF) is used in the bookbinding industry.

However, some of the parameters of the generated post-printing processing instruction information can fail to satisfy the specification of each post-printing processing unit. In this case, the post-printing processing unit cannot perform post-printing processing to the printed sheet. Therefore, an imposition correction device for correcting such imposition has been developed. The imposition correction device determines whether the generated post-printing processing instruction information satisfies the specification of each post-printing processing unit. If the generated post-printing processing instruction information does not satisfy the specification of each post-printing processing unit, the imposition correction device corrects the imposition so that the post-printing processing instruction information satisfies the specification of each post-printing processing unit.

An example of such devices is the image processing device disclosed in Japanese Laid-Open Patent Publication No. 2010-079673. This image processing device includes an imposition information analysis means, a function acquisition means, and an imposition information change means. The function acquisition means acquires a specification of a post-printing processor, and the imposition information analysis means analyzes an imposition. If the imposition information analysis means determines that the post-printing processor cannot perform post-printing processing on the sheets printed based on the imposition, the imposition information change means corrects the imposition so that the post-printing processor can perform post-printing processing on the printed sheets. This solves the problem that the post-printing processor cannot perform post-process on the printed sheets.

SUMMARY

However, although the imposition is corrected so as to satisfy the specifications of the post-printing processor, the post-printing processing has been sometimes performed with the body protruding from the cover, or sometimes bad finishing condition causes the body to fall apart. This is because the positional relationship between the cover and the body in the imposition was not appropriate. That is, determining whether the post-printing processing instruction information satisfies the specifications of the post-printing processor does not determine whether the post-printing processing instruction information is appropriate for the finish of bookbinding in the post-printing processor. Furthermore, several post-printing processing units with different roles can finish a very large number of different types of bookbinding, but imposition with consideration of the post-printing processing parameters for appropriate finishing of each bookbinding has not been possible because of the difficulty.

An object of the present disclosure is to provide a determination device and a determination program capable of determining whether post-printing processing instruction information generated by a pre-printing processor is appropriate for finishing of bookbinding by a post-printing processor.

According to an aspect of the present disclosure, there is provided a determination device including a first storage unit configured to store one or more predetermined processing rules of a post-printing processor based on processing know-how for a post-printing process; a first input unit configured to receive input of information about an update of the processing rules; an update unit configured to update the processing rules stored in the first storage unit based on the input of information about the update of the processing rules; and a determination unit configured to determine whether a post-printing processing instruction information generated by a pre-printing processor satisfies the one or more processing rules.

The determination device may further include a second storage unit and a second input unit. The second storage unit stores a specification of the post-printing processor. The second input unit receives input of information about a change of the specification of the post-printing processor. The update unit may further update the specification of the post-printing processor stored in the second storage unit based on the input of information about the change of the specification. The determination unit may further determine whether the post-printing processing instruction information satisfies the specification of the post-printing processor.

The determination device may be communicable with the pre-printing processor via a network. When the post-printing processing instruction information is received from the pre-printing processor, the determination unit may determine whether the received post-printing processing instruction information satisfies the one or more processing rules.

The determination device may be communicable with the post-printing processor via a network. When the information about the change of the specification is received from the post-printing processor, the update unit may further update the specification of the post-printing processor stored in the second storage unit based on the information about the change of the specification.

The post-printing processing instruction information may include instruction information for at least one of the cutting unit, the folding unit, the collating unit, the milling unit, the gluing unit, the binding unit, the wrapping unit, and the trimming unit.

For instance, the one or more processing rules specify at least one of the following rules for imposition: (1) maximum value and minimum value of differences between a cover width and a body width; (2) maximum value and minimum value of cut margin widths; (3) maximum value and minimum value of differences between a spine width and a milling width; and (4) layout of pages.

According to another aspect of the present disclosure, there is provided a determination program that makes a computer to function as the determination device.

BRIEF DESCRIPTION OF THE DRAWINGS

FIG. 4 is an example of processing rules stored in the first storage unit shown in FIG. 3.

DESCRIPTION OF THE EMBODIMENTS

Figure 1:
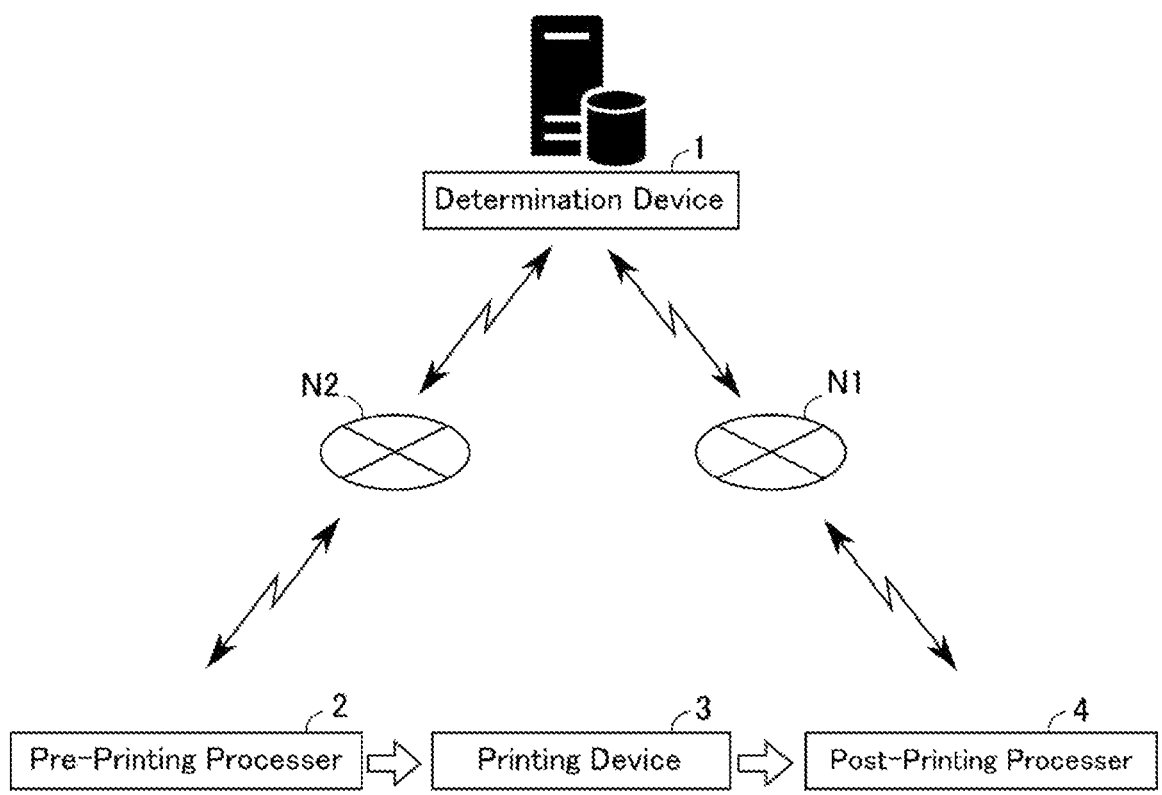
FIG. 1 is a schematic diagram of an entire bookbinding processing system using a determination device according to an embodiment of the present disclosure.

Exemplary embodiments will be described, wherein like reference numerals designate corresponding or identical elements throughout the various drawings.

FIG. 1 is a schematic diagram of the entire bookbinding processing system in which the determination device 1 according to the present embodiment is used. The processing system further includes a pre-printing processor 2, a printing device 3, a post-printing processor 4, a first network N1, and a second network N2. The pre-printing processor 2, the printing device 3, and the post-printing processor 4 may be connected to each other physically or in-line.

The pre-printing processor 2 includes a computer and others, and communicable with the determination device 1 via the second network N2. As will be described in detail later, first, the pre-printing processor 2 receives a pre-printing processing instruction information, and then performs an imposition and generates a print instruction information and a post-printing processing instruction information. The print instruction information and the post-printing processing instruction information are converted into a common format (such as JDF). The pre-printing processor 2 transmits post-printing processing instruction information to the determination device 1 via the second network N2.

Figure 2:
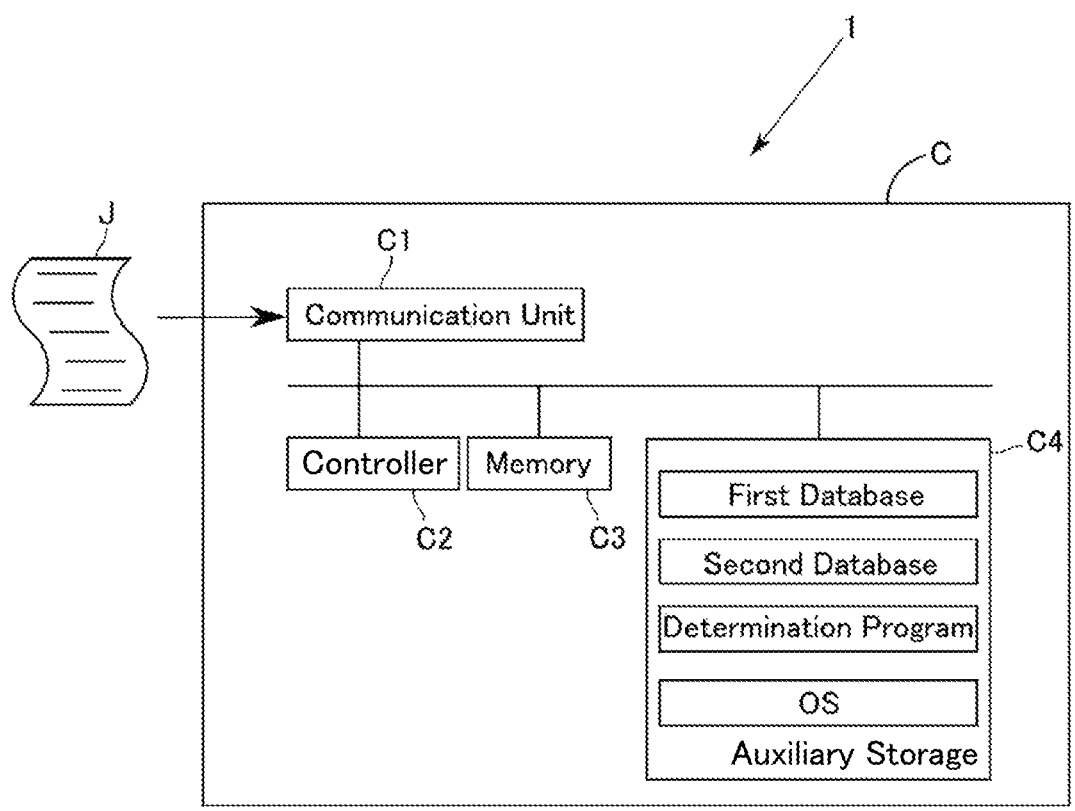
FIG. 2 is a diagram showing a hardware configuration of the determination device shown in FIG. 1.

As shown in FIG. 2, the determination device 1 includes a computer C. The computer C has a communication unit C1, a control unit C2, a memory C3, and at least one auxiliary storage C4. Examples of the auxiliary storage C4 include a magnetic disk, a magnetic optical disk, a CD-ROM, a DVD-ROM, and a semiconductor memory.

The auxiliary storage stores, for example, an OS, a determination program, a first database, which is the database of processing rules of the post-printing processor 4, and a second database, which is the database of specifications of the post-printing processor 4. The control unit C2 is a processing circuitry including a central processing unit (CPU). The CPU included in the processing circuitry reads a program (a determination program, for example) stored in the auxiliary storage into the memory to perform information processing and arithmetic processing, so that various controls described later can be achieved. The determination program causes the computer C to function as the determination device 1.

The determination device 1 receives the post-printing processing instruction information J by the communication unit C1. The determination device 1 analyzes the received post-printing processing instruction information J and determines whether the post-printing processing instruction information J satisfies the specification of the post-printing processor 4, and others. The determination performed by the determination device 1 will be described in detail later.

If the determination result of the Post-processing Instruction Information is undesirable, based on the determination result the pre-printing processor 2 generated the Post-processing Instruction Information again. The again generated post-printing processing instruction information is transmitted to the determination device 1 and determined again. When the determination result is desirable, the post-printing processing instruction information is passed to the post-printing processor 4. Similarly, when the determination result of the post-printing processing instruction information is desirable, the printing instruction information is passed to the printing device 3, and if the determination result is undesirable, the printing instruction information is generated again by the pre-printing processor 2.

The printing device 3 prints a sheet for printing according to the print instruction information when print instruction information is input. The printed sheet is passed to the post-printing processor 4.

The post-printing processor 4 has a processing unit (not shown) relating to bookbinding, such as a cutting unit, a folding unit, a collating unit, a milling unit, a binding unit, a wrapping unit, and, a trimming unit, and has a communication unit (not shown). Each processing unit may be independent or connected to each other in-line. The cutting unit includes a processing unit that performs slit cutting, die-cut cutting, and/or flat cutting. The binding unit includes a processing unit that performs saddle stitching, and/or side stitching.

The post-printing processor 4 processes the passed printed sheet according to the post-printing processing instruction information. For example, for adhesive binding, the post-printing processor 4 performs folding, collating, binding, gluing, covering, and trimming.

Figure 3:
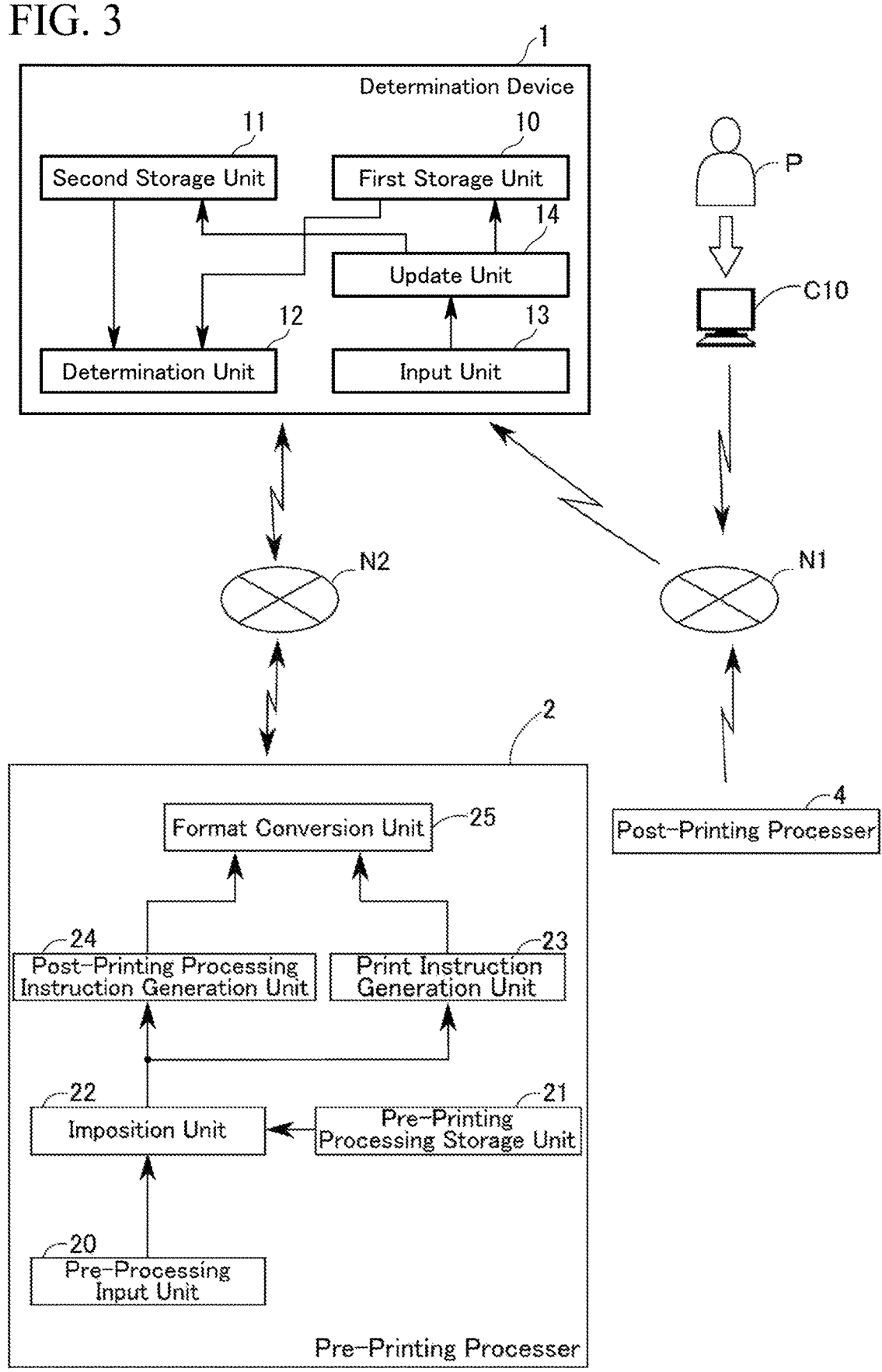
FIG. 3 is a functional block diagram of the pre-printing processor and the determination device shown in FIG. 1.

FIG. 3 is a functional block diagram of the pre-printing processor 2 and the determination device 1. As shown in FIG. 3, the pre-printing processor 2 includes a pre-printing processing input unit 20, a pre-printing processing storage unit 21, an imposition unit 22, a print instruction generation unit 23, a post-printing processing instruction generation unit 24, a format conversion unit 25, and a communication unit (not illustrated).

The pre-printing processing input unit 20 receives an input of the specification of the printing device 3 and the specification of the post-printing processor 4. The specification of the post-printing processor 4 input to the pre-printing processing input unit 20 may be different from the specification of the post-printing processor 4 stored in the second storage unit 11 (See FIG. 3). The input specifications of the printing device 3 and the specifications of the post-printing processor 4 are stored in the pre-printing processing storage unit 21. The printing device 3 and the post-printing processor 4 may be assigned a serial number unique to each device and managed by the serial number. The pre-printing processing input unit 20 further receives input of the pre-printing processing instruction information. The pre-printing processing instruction information received by the pre-printing processing input unit 20 is output to the imposition unit 22. The pre-printing processing instruction information includes, for example, a print specification necessary for imposition, including material data and information on a specification of a product (book), and serial numbers of the printing device 3 and the post-printing processor 4 used for the product, etc.

The imposition unit 22 performs imposition based on the pre-printing processing instruction information, and the specification of the printing device 3 and the specification of the post-printing processor 4, corresponding to each serial number of the pre-printing processing instruction information. The imposition unit 22 may change the page size, the orientation, and/or the trimming margin size for each page based on the pre-printing processing instruction information, the specification of the printing device 3, and the specification of the post-printing processor 4, and/or may move the position of the page in consideration of the creep width and/or the milling width. In addition, the imposition unit 22 arrange pages on the sheet, and may also arrange control strips, register marks, collating marks, signature marks, and others necessary for printing and post-printing processing. The imposition unit 22 then outputs information (simply referred to below as "imposition information") on the imposition performed by the imposition unit 22 to the print instruction generation unit 23 and the post-printing processing instruction generation unit 24.

The print instruction generation unit 23 generates the print instruction information based on the pre-printing processing instruction information, the imposition information, and the specification of the printing device 3 corresponding to the serial number in the pre-printing processing instruction information. The print instruction generation unit 23 then outputs the print instruction information to the format conversion unit 25.

The post-printing processing instruction generation unit 24 generates the post-printing processing instruction information based on the pre-printing processing instruction information, the imposition information, and the specification of the post-printing processor 4 corresponding to the serial number in the pre-printing processing instruction information. The post-printing processing instruction information includes identifier information or the serial number of the post-printing processor 4 processing the product. The post-printing processing instruction generation unit 24 then outputs the post-printing processing instruction information to the format conversion unit 25.

The format conversion unit 25 converts the input print instruction information and post-printing processing instruction information into a common format readable by the printing device 3 and the post-printing processor 4.

The converted post-printing processing instruction information is transmitted to the determination device 1 by the communication unit via the second network N2.

The determination device 1 includes a first storage unit 10, a second storage unit 11, a determination unit 12, an input unit 13, and an update unit 14.

The first storage unit 10 stores the first database. The processing rules are predetermined based on processing know-how related to the post-printing processing. Among the processing rules, a processing rule similar to the contents of the specification of the post-printing processor 4 may be removed.

The second storage unit 11 stores a second database, which is the database of the specifications of the post-printing processor 4.

The determination device 1 is communicably connected to the post-printing processor 4, for example, via the first network N1.

The specification of the post-printing processor 4 sometimes changes based on the addition or deletion of functions by adding or removing hardware or software or both. However, for example, the function acquisition means of the image processing device disclosed in the above Patent Document, Japanese Laid-Open Patent Publication No. 2010-079673, cannot flexibly cope with changes in the specification of the post-printing processor 4 due to upgrade or the availability of optional devices. Therefore, the processing system of the present embodiment is configured as follows: The post-printing processor 4 is configured to transmit information about changes of the specification to the determination device 1 when the specification is changed. Examples of the information about changes of the specification include information about changed specifications, and information about differences between changed specifications and specifications prior to changes.

The input unit 13 receives input of the information about changes of the specification received by the communication unit.

The update unit 14 updates the second database based on the input of the information about changes of the specification. Thus, the specifications of the post-printing processor 4 to be referred to by the determination device 1 are kept in the latest information.

The processing rules are predetermined rules based on the processing know-how regarding post-printing processing, thus are preferable rules for the finishing of post-printing processing of bookbinding. The processing know-how is accumulated daily and updated daily. And the processing rules are updated by adding the new processing rule, by changing the existing processing rule, and/or by deleting the existing processing rule, based on the new processing know-how. The input unit 13 receives the addition of the new processing rule, the change of the existing processing rule, and/or the deletion of the existing processing rule via the first network N1. The first storage unit 10 of the determination device 1 updates the first database based on the input of the addition of the new processing rule, the change of the existing processing rule, and/or the deletion of the existing processing rule.

Specifically, when the input unit 13 receives input of information about the update of the processing rules of the post-printing processor 4 received by the communication unit, the update unit 14 updates processing rules of the first storage unit 10 based on the input of the information.

The information about the update of the processing rules of the post-printing processor 4 includes, for example, at least one of the addition of the new processing rule, the change of the existing processing rule, or the deletion of the existing processing rule.

For example, the processing know-how may be accumulated based on the setting of the post-printing processor 4 at the time of the post-printing processing performed in the past and the state of the finishing of bookbinding processed by this setting. For example, when the finishing of bookbinding by post-printing processing is preferable, the setting of the post-printing processor 4 related to this finishing may be added to the processing know-how as a preferable setting. Then, the existing processing rule may be updated or a new processing rule may be added based on the added processing know-how. Further, for example, when the finishing of the bookbinding by the post-printing processing is undesirable, the setting of the post-printing processor 4 related to the finishing may be added to the processing know-how as an undesirable setting. Then, the existing processing rule stored in the first storage unit 10 may be updated or deleted so that the undesirable setting is not included in the processing rule.

Whether the finishing of the bookbinding is preferable may be determined, for example, based on a value of the yield. Further, for example, whether the finishing is preferable may be determined based on the result of calculating the strength of the finishing of the bookbinding determined as a good product. The finishing of the bookbinding may be determined whether the finishing of the bookbinding is preferable for each type or thickness of paper.

As shown in FIG. 3, the processing rules may be input, for example, by the maintenance manager P using a personal computer C10 or the like. The input processing rules are transmitted to the determination device 1 via the first network N1, and the input unit 13 receives the input of the processing rules. The input processing rules may be stored in the first data base and updated by the update unit 14. The processing rules specify, for example, the following rules for imposition: (1) maximum and minimum values of differences between the cover width and body width, (2) maximum and minimum values of trim margin widths for the imposition, (3) maximum and minimum values of differences between the spine width and milling width, and (4) layout of pages. The processing rule may specify at least one of the above rules.

As shown in FIG. 4, an example of a rule in the folding unit is that (1) the cover width must be larger than the body width plus 1 mm and smaller than the body width plus 3 mm. As an example of a rule in the trimming unit, it is specified that (2) the cover width before trimming must be larger than the cover width after trimming plus 1 mm and smaller than the cover width after trimming plus 5 mm. In addition, as an example of the rule in the milling unit, it is specified that (3) the spine width must be larger than the milling width plus 1 mm and smaller than the milling width plus 3 mm.

Some of such rules differ depending on the type of the post-printing processor 4. Therefore, the processing rules may be specified for each unique identifier of the post-printing processor 4, or specified for each similar specification, or both. The processing rules may be stored for each unique identifier of the post-printing processor 4, for each similar specification, or both. Such unique identifier may be, for example, the serial number.

Figure 5:
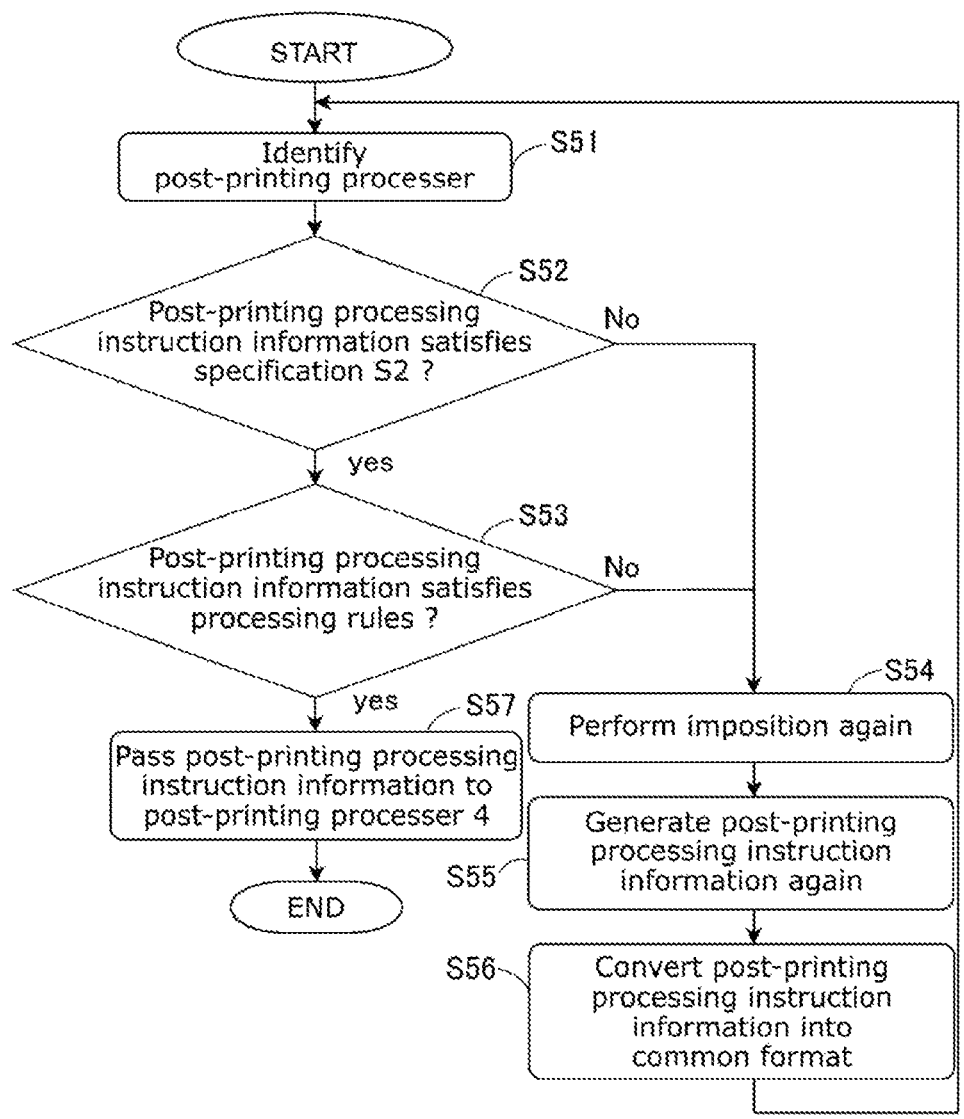
FIG. 5 is a flowchart showing a determination operation of the determination device shown in FIG. 1.

The determination unit 12 determines whether the received post-printing processing instruction information conforms to the specification of the post-printing processor 4. This will be described below with reference to FIG. 5.

(1) The determination unit 12 refers to the post-printing processing instruction information and identify which post-printing processor 4 is the target (S51).

(2) The determination unit 12 then refers to the specification of the identified post-printing processor 4 from within the second database to determine whether the post-printing processing instruction information satisfies the specification of the post-printing processor 4 (S52). This is, the determination unit 12 determines whether the post-printing processing instruction information contains a process the post-printing processor 4 cannot perform. For example, if the post-printing processing instruction information contains scoring instruction and the number of times of this scoring is the number of times post-printing processor 4 cannot perform, the determination unit 12 determines that the post-printing processing instruction information does not satisfy specification of post-printing processor 4. For example, if the post-printing processing instruction information contains a parameter exceeding the movable range of the post-printing processor 4, the determination unit 12 determines that the post-printing processing instruction information does not satisfy specification of post-printing processor 4. Since the second database is automatically updated according to the change of the specifications of the post-printing processor 4, the determination unit 12 can determine whether the post-printing processing instruction information satisfies specification of post-printing processor 4 based on the latest specifications of the post-printing processor 4.

(3) The determination unit 12 determines whether the received post-printing processing instruction information satisfies the processing rules of the post-printing processor 4 (S53). Specifically, the determination unit 12 determines whether the instruction contained in the post-printing processing instruction information satisfies the processing rule, such as whether the width of the cover before finishing contained in the post-printing processing instruction information is within the range specified by the processing rule, and/or whether the relative position of each component in the entire page in the imposition is within the range of the processing rules. When the determination unit 12 determines that the post-printing processing instruction information received from the pre-printing processor 2 does not satisfy at least one of the specification or the processing rules of the post-printing processor 4, the determination unit 12 transmits the determination result to the pre-printing processor 2.

(4) When the determination unit 12 receives the determination result, from the determination device, that the post-printing processing instruction information does not satisfy the specification and/or the processing rules of the post-printing processor 4, the pre-printing processor 2 performs imposition again based on the determination result (S54). At this time, the imposition unit 22 may, for example, change the trimming margin size of each page or move the position of the page, or change the arrangement of each component, such as register mark, collating mark, back signature with respect to the sheet from the previous imposition based on the determination result, in such a way that post-printing processing instruction information to be generated based on the imposition satisfies the processing rule. The imposition unit 22 then outputs this imposition information to the post-printing processing instruction generation unit 24.

(5) The post-printing processing instruction generation unit 24 then generates post-printing processing instruction information again (S55). The post-printing processing instruction generation unit 24 may generate the post-printing processing instruction information based on the pre-printing processing instruction information, the imposition information, the specification of the post-printing processor 4 stored in the pre-printing processing storage unit 21, and the determination result of the determination unit 12. The post-printing processing instruction generation unit 24 then outputs the post-printing processing instruction information to the format conversion unit 25.

(6) Re-generated post-printing processing instruction information is converted into a common format by the format conversion unit 25 and then transmitted to the determination device 1 (S56).

(7) When the determination unit 12 determines that the post-printing processing instruction information satisfies the specification and the processing rules of the post-printing processor 4, the post-printing processing instruction information is passed to the post-printing processor 4 (S57).

Thus, the post-printing processing instruction information is corrected by post-printing processing instruction generation unit 24 to satisfy the specification and the processing rules of the post-printing processor 4, the post-printing processor 4 is prevented from being unable to perform post-printing processing instruction, and furthermore, even if the skill of the operator of the post-printing processor 4 is low, bookbinding with good finish can be performed by the post-printing processor 4.

According to the determination device 1 described above, it is possible to determine whether the post-printing processing instruction information generated by the pre-printing processor is appropriate for the finishing of each bookbinding by the post-printing processor.

Although the embodiment of the determination device 1 according to the present disclosure has been described above, the present disclosure is not limited to the above embodiment. The present disclosure may be practiced, for example, in the following embodiments.

The first database and the second database may be stored in another storage means that is physically separated from the computer C, for example. In this case, the computer C accesses the first database and the second database by wireless or wired communication with this storage means.

The post-printing processing instruction information may include instruction information for at least one of the cutting unit, the folding unit, the collating unit, the milling unit, the gluing unit, the binding unit, the wrapping unit, or the trimming unit. Not every post-printing processing instruction information all for these processing units may not be determined by the determination device 1.

When the determination unit 12 determines that the post-printing processing instruction information does not satisfy the specification and/or the processing rules of the post-printing processor 4, the determination device 1 may notify the determination result together with the content of the corresponding specification and the processing rule.

In addition, when the determination unit 12 determines that the post-printing processing instruction information does not satisfy the specification and/or the processing rules of the post-printing processor 4, the determination device 1 may inform the user how to correct the imposition to satisfy specification and the processing rule together with the result of the determination.

The post-printing processor 4 specification changes may be done, for example, as in the processing rules, by the maintenance manager P using a personal computer C10. In this case, the input change of the specification of the post-printing processor 4 is transmitted to the determination device 1 via the first network N1, and the input unit 13 receives the input of the post-printing processor 4 specification changes.

The input unit 13 that serves as two input units, one of which receives the input of the processing rule, and the other of which receives the input of the change of specification of the post-printing processor 4. The two input units, however, may be configured separately.

The above described embodiment is explained by an example in which the determination device includes both the first storage unit 10 to store the database of the processing rules of the post-printing processor and the second storage unit 11 to store the database of the specification of the post-printing processor, and the determination unit determines whether the post-printing processing instruction information satisfies the specification and the processing rules of the post-printing processor. However, the structure of the determination device is not limited to this example. Either one of the storage units may be provided, and the post-printing processing instruction information may be determined based on either the specification or the processing rules, for example.

The invention claimed is:

1. A determination device comprising:
    a first storage unit configured to store one or more predetermined processing rules of a post-printing processor, the one or more predetermined processing rules including at least one of the following rules for imposition:
       maximum and minimum values of differences between a cover width and a body width;
       maximum and minimum values of differences between a spine width and a milling width; or
       layout of pages;
    a second storage unit configured to store a specification of the post-printing processor; and
    a determination unit configured to determine whether a post-printing processing instruction information generated by a pre-printing processor satisfies the one or more processing rules, to determine whether the post-printing processing instruction information satisfies the specification of the post-printing processor, and to notify a determination result together with at least one of the specification of the post-printing processor or the one or more processing rules, when determining that the post-printing processing instruction information satisfies either the specification or the one or more processing rules, or satisfies neither the specification nor the one or more processing rules.

2. The determination device according to claim 1, further comprising:
    an input unit configured to receive input of information about a change of the specification of the post-printing processor; and
    an update unit configured to update the specification of the post-printing processor stored in the second storage unit based on the input of information about the change of the specification.

3. The determination device according to claim 2, wherein the determination device is communicable with the post-printing processor via the network, and
    wherein when the information about the change of the specification is received from the post-printing processor, the update unit is further configured to update the specification of the post-printing processor stored in the second storage unit based on the information about the change of the specification.

4. The determination device according to claim 1, wherein the determination device is communicable with the pre-printing processor via a network, and wherein when the post-printing processing instruction information is received from the pre-printing processor, the determination unit is configured to determine whether the received post-printing processing instruction information satisfies the one or more processing rules.

5. The determination device according to claim 1, wherein the post-printing processing instruction information includes instruction information for at least one of a cutting unit, a folding unit, a collating unit, a milling unit, a gluing unit, a binding unit, a wrapping unit, or a trimming unit.

6. A non-transitory, computer-readable medium storing a determination program including instructions to cause a computer to function as the determination device according to claim 1.

7. The determination device according to claim 1, further comprising:

an input unit configured to receive input of information about an update of the processing rules; and an update unit configured to update the processing rules stored in the first storage unit based on the input of information about the update of the processing rules.

8. A determination device comprising:

a processor; and a memory including a program that, when executed by the processor, causes the processor to perform operations, the operations including:

accessing a first storage unit storing one or more predetermined processing rules of a post-printing processor, the one or more predetermined processing rules including at least one of the following rules for imposition:

maximum and minimum values of differences between a cover width and a body width;

maximum and minimum values of differences between a spine width and a milling width; or layout of pages; and determining whether a post-printing processing instruction information generated by a pre-printing processor satisfies the one or more processing rules;

accessing a second storage unit storing a specification of the post-printing processor;

determining whether the post-printing processing instruction information satisfies the specification of the post-printing processor; and notifying a determination result together with at least one of the specification of the post-printing processor or the one or more processing rules, when determining that the post-printing processing instruction information satisfies either the specification or the one or more processing rules, or satisfies neither the specification nor the one or more processing rules.

9. The determination device according to claim 8, the operations further including:

receiving input of information about an update of the processing rules different from the specification of the post-printing processor; and updating the processing rules stored in the first storage unit based on the input of information about the update of the processing rules.

10. A non-transitory, computer-readable medium storing a determination program including instructions to cause a computer to function as the determination device according to claim 8.

* * * * *